(12) United States Patent
Chang

(10) Patent No.: US 7,417,805 B2
(45) Date of Patent: Aug. 26, 2008

(54) CAMERA DEVICE

(75) Inventor: Jen-Tsorng Chang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 11/938,470

(22) Filed: Nov. 12, 2007

(65) Prior Publication Data

US 2008/0130144 A1 Jun. 5, 2008

(30) Foreign Application Priority Data

Dec. 1, 2006 (CN) .................. 2006 1 0157197

(51) Int. Cl.
*G02B 15/14* (2006.01)
*G02B 7/02* (2006.01)

(52) U.S. Cl. ........................... 359/704; 359/818

(58) Field of Classification Search ............... 359/694, 359/699–704, 808, 811, 815, 818–819, 822–823, 359/826
See application file for complete search history.

(56) References Cited

U.S. PATENT DOCUMENTS

2001/0033436 A1* 10/2001 Hunter ............... 359/819
2006/0103953 A1* 5/2006 Lee et al. ............ 359/819

* cited by examiner

*Primary Examiner*—Scott J. Sugarman
*Assistant Examiner*—Dawayne A Pinkney

(57) ABSTRACT

An exemplary camera device includes a barrel holder having a first central axis, a barrel having a second central axis, an image sensor disposed in the barrel holder, and at least one lens disposed in the barrel. The barrel is engaged in the barrel holder. The barrel holder includes a base and a plurality of spaced resilient clamping members. The clamping members substantially perpendicularly extend from the base. Each of the clamping members includes a plurality of protrusions formed thereon. The protrusions protrude towards the first central axis. The barrel includes a plurality of engaging members formed on an outer surface thereof. The engaging members extend along a direction parallel to the second central axis. Each of the engaging members defines a plurality of grooves engaged with the protrusions.

15 Claims, 4 Drawing Sheets

CAMERA DEVICE

BACKGROUND

1. Technical Field

The present invention relates to optical imaging devices and, particularly, to a camera device.

2. Description of Related Art

With the development of the optical imaging technology, some electronic devices are being widely used; camera devices, such as digital cameras and mobile phones are examples of widely used electronic devices.

Generally, a camera device includes a barrel holder, a barrel unit, and an image sensor. The barrel unit includes a barrel and a plurality of lenses disposed in the barrel. The barrel unit has an optical axis. The barrel is coupled to the barrel holder in a threaded manner. The image sensor is disposed in the barrel holder. In order to focus, the barrel is rotated relative to the barrel holder, thus adjusting a distance between the barrel unit and the image sensor. In this way, an appropriate focus can be achieved.

However, due to the fit variation between the barrel holder and the barrel, the optical axis of the barrel unit may also be rotated while rotating the barrel. Accordingly, the imaging quality of the camera device is deteriorated.

It is therefore desirable to find a new camera device that is capable of overcoming the above mentioned problems.

SUMMARY

An exemplary camera device includes a barrel holder having a first central axis, a barrel having a second central axis, an image sensor disposed in the barrel holder, and at least one lens disposed in the barrel. The barrel is engaged in the barrel holder. The barrel holder includes a base and a plurality of spaced resilient clamping members. The clamping members substantially perpendicularly extend from the base. Each of the clamping members includes a plurality of protrusions formed thereon. The protrusions protrude towards the first central axis. The barrel includes a plurality of engaging members formed on an outer surface thereof. The engaging members extend along a direction parallel to the second central axis. Each of the engaging members defines a plurality of grooves engaged with the protrusions.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
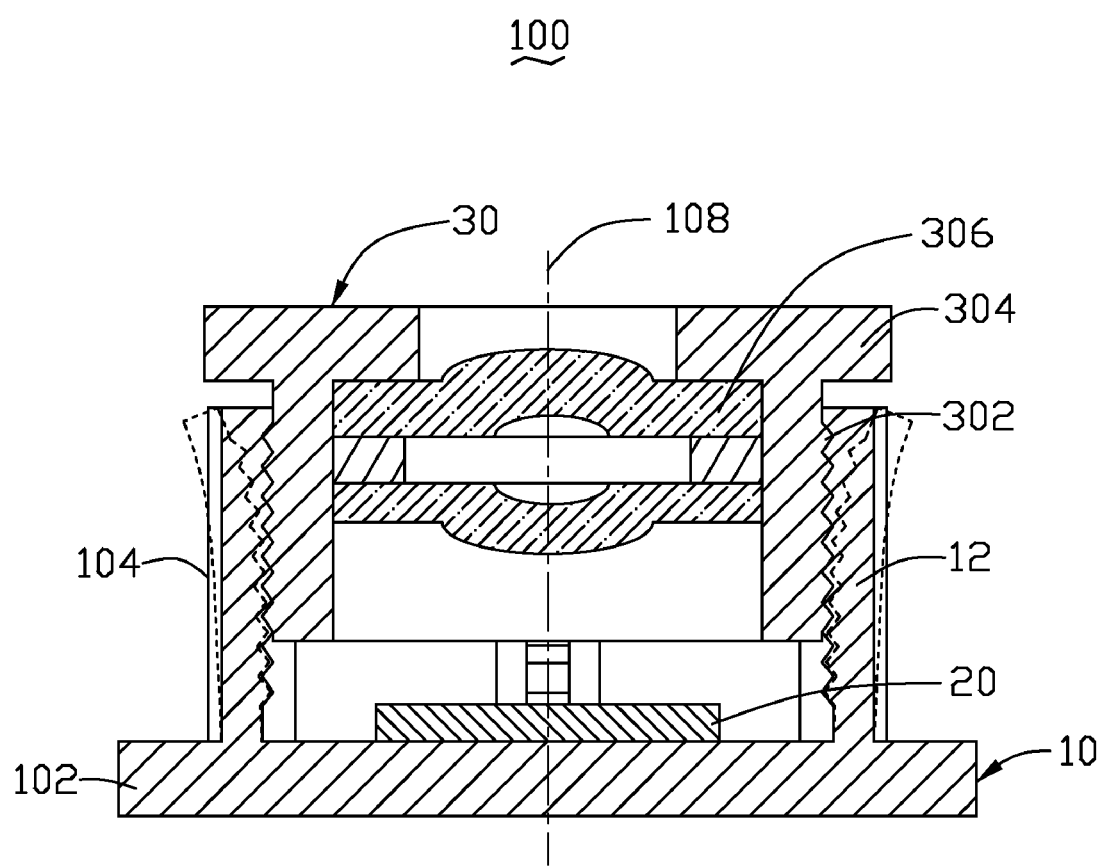
FIG. 1 is a schematic, side cross-sectional view of a camera device according to a first embodiment.

Referring to FIG. 1, a camera device 100 of a first embodiment is shown. The camera device 100 includes a barrel holder 10, a barrel 30, an image sensor 20, and at least one lens 306. The barrel 30 is irrotationally and axially movably engaged in the barrel holder 10. The barrel holder 10 has a first central axis 108. The image sensor 20 is attached on the base 102 of the barrel holder 10.

Figure 2:
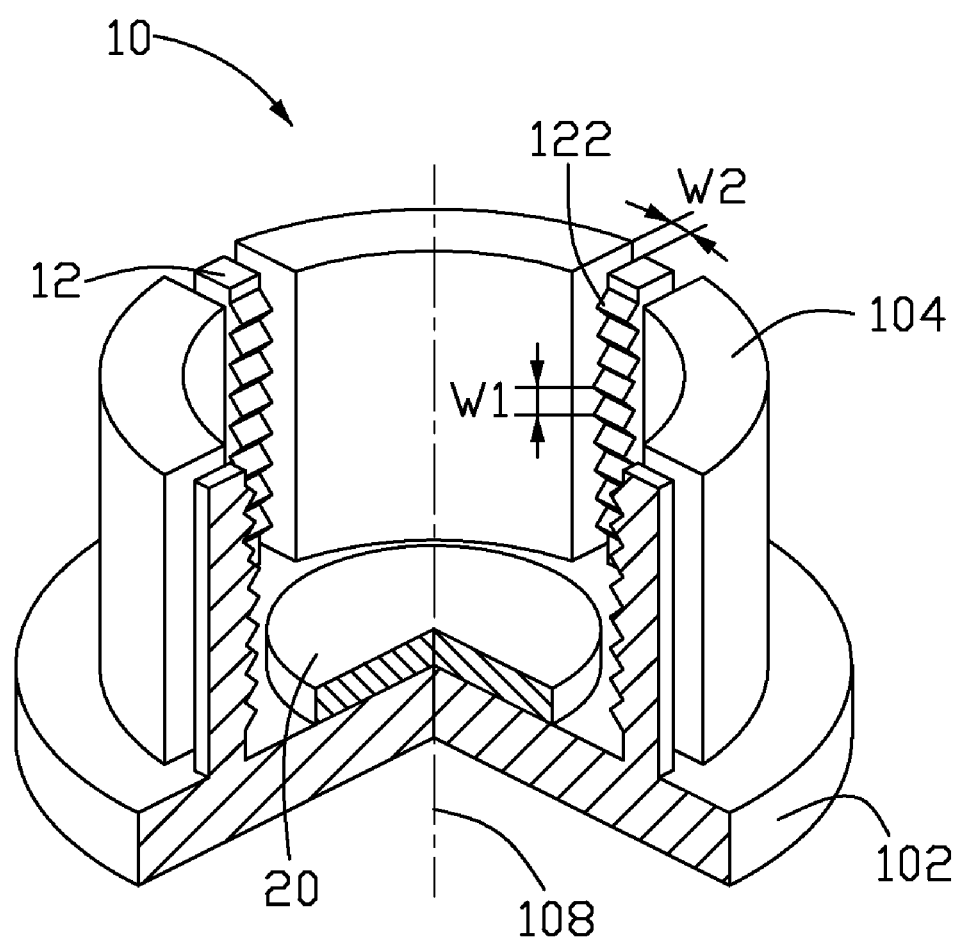
FIG. 2 is a schematic, partial sectional view of a barrel holder shown together with an image sensor of the camera device of FIG. 1.

Referring to FIG. 2, the barrel holder 10 includes a base 102, a plurality of spaced clamping members 12, and a plurality of side walls 104. The clamping members 12 and the side walls 104 are arranged in an alternate fashion on the base 102. The clamping members 12 are resiliently deformable outwardly. The present embodiment includes a total of four clamping members 12.

Each of the clamping members 12 is formed on the base 102 and extends substantially perpendicularly from the base 102. The clamping members 12 can be separated, with respect to the first central axis 108, in an equiangular manner on a plane perpendicular to the first central axis 108. Each of the clamping members 12 has a plurality of V-shaped protrusions 122 formed thereon. The clamping members 12 protrude towards the first central axis 108. A center-to-center distance between every two adjacent protrusions 122 can be in an approximate range from 10 microns to 20 microns. The clamping members 12 can be formed integrally with the base 102.

The side walls 104 are formed on the base 102 and configured for surrounding the barrel 30 (see FIG. 1). The side walls 104 can be cylindrical. The present embodiment includes four side walls 104. Each of the side walls 104 is positioned between every two adjacent clamping members 12. A distance W2 between the clamping member 12 and the side walls 104 can be larger than 10 microns.

Figure 3:
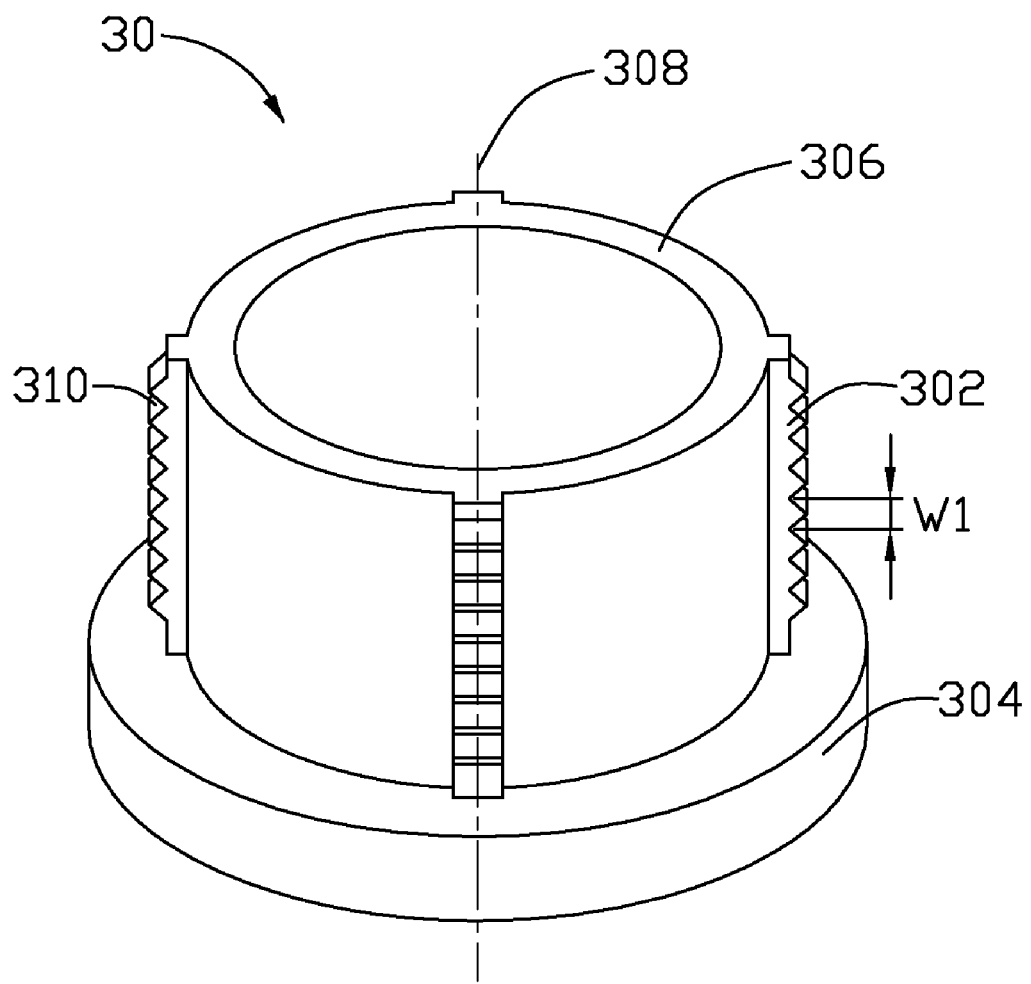
FIG. 3 is a schematic, isometric view of a barrel of the camera device of FIG. 1.

Referring to FIG. 3, the barrel 30 includes a main body 306, a focus ring 304, and a plurality of spaced engaging members 302. The barrel 30 has a second central axis 308. The engaging members 302 are configured for coupling with the clamping members 12 (described in detail later). The engaging members 302 are formed on an outer surface of the barrel 30. The engaging members 302 extend along a direction parallel to the second central axis 308. The engaging members 302 can be separated, with respect to the second central axis 308, in an equiangular manner on a plane perpendicular to the second central axis 308. The number of the engaging members 302 is identical with that of the clamping members 12.

Each of the engaging members 302 is corresponding to each of the clamping members 12. Each of the engaging members 302 has a plurality of V-shaped grooves 310, periodically defined therein. The V-shaped grooves 310 correspond to the V-shaped protrusions 122 of the clamping members 12. A center-to-center distance between every two adjacent grooves 310 is equal to that between every two adjacent protrusions 122 formed on the clamping members 12 (see FIG. 2). That is, the center-to-center distance between every two adjacent grooves 310 is also W1. In assembly, the protrusions 122 (see FIG. 2) are snappingly engaged in the grooves 310, as seen in FIG. 1.

The lens 306, whereby there is at least one lens 306 in the camera device 100, is positioned in the barrel 30. An optical axis of the lens 306 is coinciding with the second central axis 308 of the barrel 30.

Referring to FIG. 1 again, the barrel 30 is engaged with the barrel holder 10 by coupling the engaging members 302 to the clamping members 12. In assembling, the barrel 30 is pushed towards side walls 104, side walls 104 being a part of the barrel holder 10, along the first central axis 108. When the barrel 30 is pushed towards the side walls 104, side walls 104 being a part of barrel holder 10, the clamping members 12 bends outward (see doted lines of FIG. 1). In this manner, the barrel 30 is assembled into the barrel holder 10 by being pushed towards the side walls 104, a part of barrel holder 10. The barrel 30 can be pushed towards or pulled away from the side walls 104 of barrel holder 10 along the first central axis 108 until a proper focus is achieved. After achieving the appropriate focus, glue can be applied between the barrel 30 and the side walls 104 of barrel holder 10, accordingly fastening the barrel 30 to the barrel holder more firmly.

In assembly, the barrel 30 is assembled into the side walls 104 of barrel holder 10 by pushing the barrel 30 towards the side walls 104 of barrel holder 10 without rotating. Thus, the optical axis rotation of the at least one lens 306, which is caused by rotation of the barrel 30, is avoided. In this way, the concentricity between the side walls 104 of barrel holder 10 and the barrel 30 is maintained. Therefore, the imaging quality of the camera device 100 is improved. Furthermore, in focusing, the barrel 30 can be pushed towards or pulled away from the side walls 104 of barrel holder 10 without rotating to achieve an appropriate focus. Likewise, the optical axis rotation of the at least one lens 306 is avoided, the concentricity between the barrel holder 10 and the barrel 30 is maintained. Therefore, the imaging quality of the camera device 100 is further improved.

Figure 4:
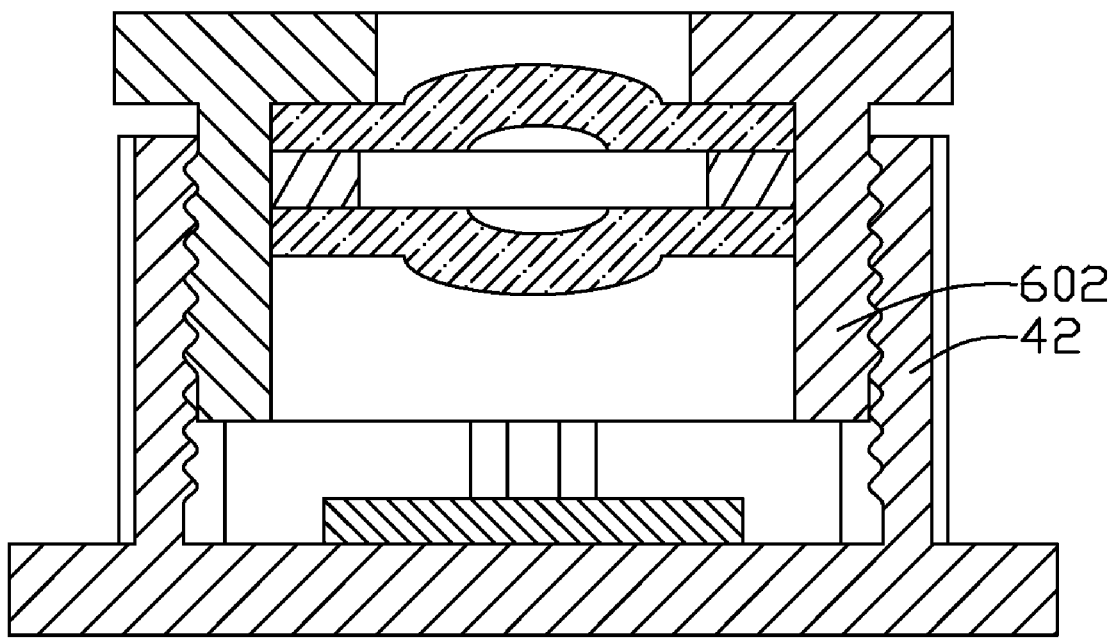
FIG. 4 is a schematic, side cross-sectional view of a camera device, according to a second embodiment.

Referring to FIG. 4, a camera device 200 of a second embodiment is shown. The camera device 200 is similar to the camera device 100, but the clamping member 42 has a plurality of arc-shaped protrusions formed thereon and the engaging member 602 has a plurality of arc-shaped grooves defined therein. Each protrusion can have a sine curve, a circular curve, or an ellipse curve in side cross-section.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A camera device comprising:
   a barrel holder having a first central axis thereof, the barrel holder comprising a base and a plurality of spaced resilient clamping members, the clamping members substantially perpendicularly extending from the base, each of the clamping members comprising a plurality of protrusions formed thereon, the protrusions protruding toward the first central axis;
   a barrel engaged in the barrel holder, the barrel comprising a second central axis, and a plurality of spaced engaging members formed in an outer surface thereof, the engaging members extending along a direction parallel to the second central axis, each of the engaging members defining a plurality of grooves engaged with the protrusions;
   an image sensor disposed in the barrel holder; and
   at least one lens disposed in the barrel.

2. The camera device as claimed in claim 1, wherein the barrel holder comprises a plurality of side walls formed on the base between every two adjacent clamping members.

3. The camera device as claimed in claim 1, wherein the clamping members are arranged with respect to the first central axis in an equiangular manner.

4. The camera device as claimed in claim 1, wherein the engaging members are separated with respect to the second central axis, in an equiangular manner, on a plane perpendicular to the second central axis.

5. The camera device as claimed in claim 1, wherein the protrusions are V-shaped or arc-shaped in cross-section.

6. The camera device as claimed in claim 1, wherein the image sensor is attached on the base of the barrel holder.

7. The camera device as claimed in claim 1, wherein a center-to-center distance between every two adjacent protrusions is in an approximate range from 10 microns to 20 microns.

8. The camera device as claimed in claim 1, wherein the grooves are V-shaped or arc-shaped in cross-section.

9. The camera device as claimed in claim 1, wherein the barrel is irrotationally and axially movably engaged in the barrel holder.

10. The camera device as claimed in claim 1, wherein the barrel is secured to the barrel holder.

11. The camera device as claimed in claim 10, wherein the barrel is secured to the barrel holder using glue.

12. A camera device comprising:
   a barrel holder including a base, a plurality of spaced sidewalls, and a plurality of spaced clamping members, the sidewalls and the clamping member substantially perpendicularly extending from the base and being arranged in an alternate fashion on the base, the clamping members being resiliently deformable outwardly and each comprising a plurality of protrusions protruding inward;
   a barrel axially movably engaged in the barrel holder, the barrel comprising a plurality of grooves defined in an outer surface thereof, the protrusions being snappingly engaged in the grooves;
   an image sensor disposed in the barrel holder; and
   at least one lens disposed in the barrel.

13. The camera device as claimed in claim 12, wherein the barrel is irrotationally and axially movable relative to the barrel holder.

14. A camera device comprising:
   a barrel holder including a base, a plurality of spaced clamping members substantially perpendicularly extending from the base, the clamping members being resiliently deformable outwardly and each comprising a plurality of protrusions protruding inward;
   a barrel axially movably engaged in the barrel holder, the barrel comprising a plurality of grooves defined in an outer surface thereof, the protrusions being snappingly engaged in the grooves;
   an image sensor disposed in the barrel holder; and
   at least one lens disposed in the barrel.

15. The camera device as claimed in claim 14, wherein the barrel is irrotationally and axially movable relative to the barrel holder.

* * * * *